(12) United States Patent
Takeshita

(10) Patent No.: US 8,052,117 B2
(45) Date of Patent: Nov. 8, 2011

(54) FLUID CONTROL VALVE

(75) Inventor: Masahiro Takeshita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 332 days.

(21) Appl. No.: 12/445,332

(22) PCT Filed: Oct. 25, 2007

(86) PCT No.: PCT/JP2007/071264
§ 371 (c)(1),
(2), (4) Date: Apr. 13, 2009

(87) PCT Pub. No.: WO2008/053943
PCT Pub. Date: May 8, 2008

(65) Prior Publication Data
US 2010/0108933 A1    May 6, 2010

(30) Foreign Application Priority Data
Nov. 1, 2006   (JP) .................................. 2006-297352

(51) Int. Cl.
*F16K 31/02* (2006.01)
(52) U.S. Cl. ................................ 251/129.22; 251/129.1
(58) Field of Classification Search ............ 251/129.01, 251/129.09, 129.1, 129.22
See application file for complete search history.

(56) References Cited

U.S. PATENT DOCUMENTS

| | | | |
|---|---|---|---|
| 2,922,614 A * | 1/1960 | Nickells | 251/54 |
| 4,595,170 A * | 6/1986 | Livet | 251/129.05 |
| 4,925,155 A * | 5/1990 | Carman | 251/117 |
| 5,544,856 A * | 8/1996 | King et al. | 251/129.08 |
| 6,076,803 A * | 6/2000 | Johnson et al. | 251/129.22 |
| 6,892,997 B2 * | 5/2005 | Kreuter | 251/129.16 |

FOREIGN PATENT DOCUMENTS

EP    0 436 214 A1    7/1991

(Continued)

OTHER PUBLICATIONS

Office Action issued Nov. 11, 2010 in corresponding Chinese Patent Application No. 200780040588.1 and partial English translation thereof.

(Continued)

*Primary Examiner* — John Fristoe, Jr.
(74) *Attorney, Agent, or Firm* — Kenyon & Kenyon LLP

(57) ABSTRACT

A fluid control valve comprises a valve element, a casing, a fluid flow passage formed in the casing, and an actuator drivingly moving the valve element to the casing in the axial direction. The fluid flow passage introduces a fluid from the inlet for the fluid and supplies the fluid into the clearance between the inner wall surface of a guide part and the outer peripheral surface of the valve element to lift the valve element relative to the inner wall surface of the guide part in the state of non-contact with each other. The actuator moves the valve element in the axial direction in the state of non-contact and changes the clearance between the outlet of the casing and the tip of the valve element to control the output flow amount or output pressure of the fluid.

5 Claims, 1 Drawing Sheet

FOREIGN PATENT DOCUMENTS

| | | |
|---|---|---|
| JP | 60-78180 A | 5/1985 |
| JP | 61-103078 A | 5/1986 |
| JP | 3-41905 | 4/1991 |
| JP | 3-200592 A | 9/1991 |
| JP | 2003-65303 A | 3/2003 |
| JP | 2005-273704 A | 10/2005 |

OTHER PUBLICATIONS

Office Action issued Mar. 29, 2011 in corresponding Japanese Patent Application No. 2006-297352 and English translation thereof.
Office Action issued Mar. 11, 2011 in corresponding German Patent Application No. 112007002618.9 and English translation thereof.

* cited by examiner and varying the clearance between the outlet of the casing and the tip of the valve element to thereby control an output flow rate or an output pressure of the fluid.

FLUID CONTROL VALVE

This is a 371 national phase application of PCT/JP2007/071264 filed 25 Oct. 2007, claiming priority to Japanese Patent Application No. JP 2006-297352 filed 1 Nov. 2006, the contents of which are incorporated herein by reference.

TECHNICAL FIELD

The present invention relates to a fluid control valve and, specifically, to a fluid control valve for driving a valve element to move in the axial direction with respect to a casing and varying a clearance between the outlet of the casing and the tip of the valve element to thereby control the output flow rate or the output pressure of fluid.

BACKGROUND ART

In order to control the flow of fluid, there is employed a control valve for driving a valve element to move in the axial direction with respect to a casing and varying a clearance between the outlet of the casing and the tip of the valve element to thereby control the output flow rate or the output pressure of the fluid. For example, the flow of the fluid is blocked by bringing the outlet of the casing into contact with the tip of the valve element, and the fluid is allowed to flow by separating the outlet of the casing and the tip of the valve element. By repeating the contact and separation, precise adjustment of the flow rate or the pressure of the fluid is achieved.

For example, in JP-A-2005-273704, as regards a valve mechanism used for purging (exhausting) exhaust gas including water from a fuel cell to the outside, there is described a valve device including a valve element which is provided at the tip of a shaft inserted into a core member and hence supported thereby and driven by a solenoid so as to be capable of advancing and retracting in the axial direction, the valve device blocking a flow passage by the valve element being seated on a valve seat, and allowing fluid to flow into the flow passage by the valve element being separated from the valve seat.

In the fluid control valve which blocks the flow passage or allows the fluid to flow into the flow passage by bringing the tip of the valve element into contact with or separated from the fluid outlet of the casing, a shaft portion of the valve element is supported by the casing so as to be capable of advancing and retracting as described in JP-A-2005-273704. Therefore, a supporting portion is worn by the sliding movement as the movement of advancing and retracting is repeated. When the abrasion progresses, the advancing and retracting movement of the valve element in the axial direction might be deviated, which may result in incomplete blockage of the flow passage. Also, abrasion powder which is generated by abrasion might flow with the fluid, and contaminate the downstream side.

An object of the present invention is to provide a fluid control valve which is able to restrain abrasion of a part between a valve element and a casing when the tip of the valve element is moved with respect to a fluid outlet of the casing.

DISCLOSURE OF THE INVENTION

A fluid control valve according to the present invention includes: a valve element having a tip for controlling a flow of fluid; a casing having a fluid inlet, a guide part for guiding the valve element so as to be capable of moving in the axial direction, and a fluid outlet arranged so as to oppose the tip of the valve element; a fluid flow passage provided in the casing for guiding the fluid from the fluid inlet, supplying the fluid to a clearance between an inner wall surface of the guide part and an outer peripheral surface of the valve element, and causing the valve element to lift relative to the inner wall surface of the guide part; and an actuator for driving the valve element to move in the axial direction with respect to the casing and varying the clearance between the outlet of the casing and the tip of the valve element to thereby control an output flow rate or an output pressure of the fluid.

In the fluid control valve according to the present invention, it is preferable that the fluid flow passage passes from the fluid inlet through an interior of the casing and causes the fluid to be blown out from exhaust openings arranged equidistantly with respect to the circumferential direction of the casing toward the outer peripheral surface of the valve element.

In the fluid control valve according to the present invention, it is preferable that the fluid flow passage includes at least one buffer fluid chamber, and a plurality of branched flow passages connecting the buffer fluid chamber to the plurality of exhaust openings.

In the fluid control valve according to the present invention, it is preferable that the actuator includes a drive coil provided in the interior of the casing, and a movable element portion connected to the valve element, and the fluid flow passage further includes an actuator portion fluid flow passage for supplying the fluid to a clearance between an outer periphery of the movable element portion and an inner peripheral surface of the drive coil to thereby cause the movable element portion to lift relative to the inner peripheral surface of the drive coil.

In the fluid control valve according to the present invention, it is preferable to include a seal portion provided at the outlet of the casing, having an opening of a shape corresponding to the shape of the tip of the valve element, and being formed of a different material from the casing.

In the fluid control valve according to the present invention, the seal portion is preferably formed of a material having higher elasticity than metal.

In this configuration, the fluid control valve is formed with a fluid flow passage provided in the casing for guiding the valve element in the axial direction for guiding the fluid from the fluid inlet, supplying the fluid to the clearance between the inner wall surface of the guide part and the outer peripheral surface of the valve element, and causing the valve element to lift relative to the inner wall surface of the guide part. When the fluid is supplied to the clearance between the opposed surfaces, the portion between the opposed surfaces defines a lifting clearance by being supported by the fluid and assumes a non-contact state by a so-called fluid bearing mechanism. This enables the valve element to move in the axial direction out of contact with the guide part, so that the abrasion between the valve element and the casing is restrained. Since the fluid used in the fluid bearing mechanism is fluid that is as an object of flow rate control or pressure control, specific fluid for fluid support is not necessary.

Since the fluid flow passage causes the fluid to pass from the fluid inlet through the interior of the casing and to be blown out from the exhaust openings arranged equidistantly with respect to the circumferential direction of the casing toward the outer peripheral surface of the valve element, the fluid is supplied uniformly with respect to the outer peripheral surface of the valve element, and the valve element is automatically centered along the axial direction.

Since the fluid flow passage has at least one buffer fluid chamber, variation in fluid pressure or the like is reduced, and stable fluid support is achieved.

Since the fluid is supplied to the clearance between the outer periphery of the movable element portion and the inner peripheral surface of the drive coil to thereby cause the movable element portion to lift relative to the inner peripheral surface of the drive coil when the actuator is provided in the interior of the casing, abrasion caused by the axial movement at the actuator portion may be restrained as well.

Since the seal portion formed of a different material from the casing is provided at the outlet of the casing, abrasion of the outlet of the casing which comes into contact with the tip of the valve element is restrained by using, for example, a material less prone to abrasion.

Since the seal portion is formed of a material having higher elasticity than metal, good contact with the valve member is achieved, so that reliable blockage of the fluid is achieved.

DESCRIPTION OF EXEMPLARY EMBODIMENTS

Figure 1:
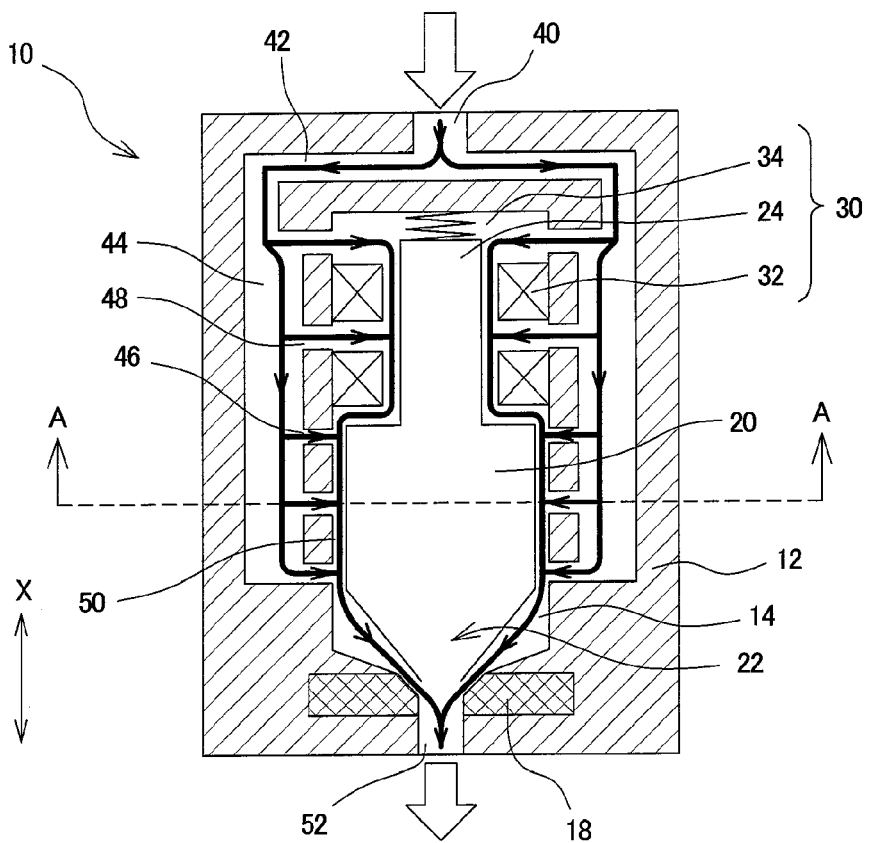
FIG. 1 is a cross-sectional view of a fluid control valve according to an embodiment of the present invention.

Referring now to the drawings, an embodiment of the present invention will be described in detail. Although a fluid control valve used for pressure control or flow rate control of fuel gas for a fuel cell system will be described below, the fluid control valve of the present invention may be used for other applications, so long as it is used for controlling the flow of fluid by moving a tip of a valve element with respect to a fluid outlet of a casing. For example, it may be employed as a fluid control valve used for an exhaust gas line in the fuel cell system, or as a flow rate control valve for cooling water in an intercooler. A fluid control valve used in systems other than the fuel cell system is also applicable. For example, it may be employed as a fuel injection valve for internal combustion engines or as a fluid control valve for windshield washers of vehicles. Accordingly, the fluid may be gas, liquid, or vapor-liquid mixture.

Figure 2:
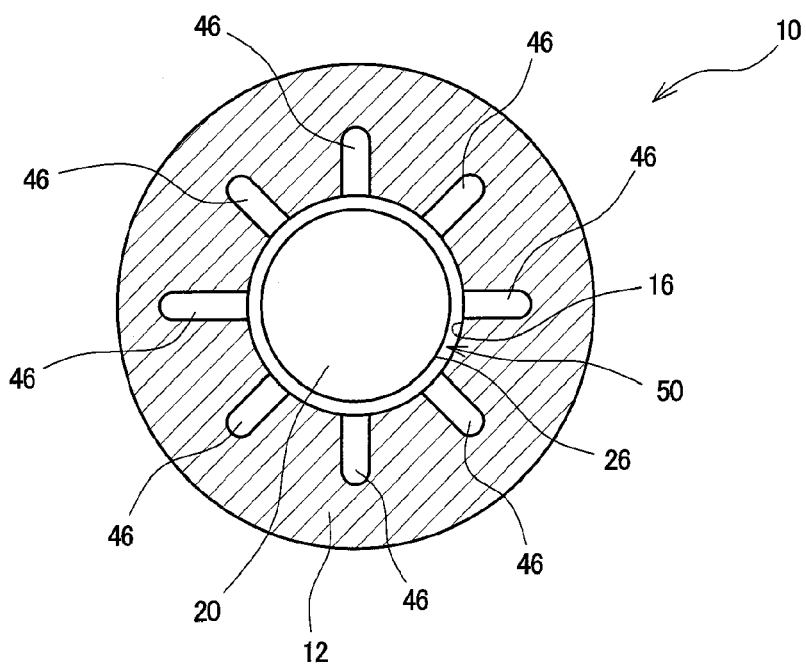
FIG. 2 is a cross-sectional view taken along line A-A in FIG. 1.

FIG. 1 is a cross-sectional view of a fluid control valve 10, and FIG. 2 is a cross-sectional view taken along line A-A in FIG. 1. The fluid control valve 10 is an electromagnetic valve used for adjusting the pressure of hydrogen gas serving as fuel gas in a fuel cell system. In the following description, it is described as a pressure control valve. However, it may be a flow rate control valve, according to the application. The fluid control valve 10 includes a casing 12, a valve element 20 guided by a guide part 14 in the interior of the casing 12, an actuator 30 for driving the valve element 20 to move in the axial direction which is indicated as direction X in FIG. 1, and a fluid flow passage 42 formed integrally in the interior of the casing 12.

The casing 12 has a column-shaped outline and, as shown in FIG. 1, is provided with a fluid inlet 40 on the upper surface side and a fluid outlet 52 on the lower surface side thereof. The casing 12, being a member including the guide part 14 and the fluid flow passage 42 and having a rather complicated internal shape as described later, may be those obtained by molding, for example, metal into a predetermined shape. As the metal material, for example, aluminum or the like may be used.

The guide part 14 is a space being provided at the center portion of the casing 12 along the axial direction and including an elongated cylindrical space portion having a circular cross section, and a connecting portion having an inner diameter reducing gradually from the elongated cylindrical portion toward the fluid outlet 52 and being connected to the fluid outlet 52, and has a function of guiding and housing the valve element 20 so as to be capable of moving in the axial direction. Here, an elongated cylindrical inner wall surface 16 (see FIG. 2) has a function of guiding an outer peripheral surface 26 of the valve element 20.

The fluid flow passage 42 is a conduit integrated in the interior of the casing 12. The fluid flow passage 42 starts from the fluid inlet 40 opening at the center portion on the upper surface side of the casing 12, extends in the radial direction toward the outer peripheral side of the casing 12, then is connected to a buffer fluid chamber 44 extending in the axial direction on the outer peripheral side of the casing 12, extends from the buffer fluid chamber 44 as a plurality of branched flow passages 46, 48, and opens at respective locations of the inner wall surface 16 of the guide part 14.

The buffer fluid chamber 44 is a space having an adequately large space volume in comparison with the branched flow passages 46, 48 or the like, and has a function of restraining temporal pulsations or the like of the fluid pressure or the like, by temporarily storing the fluid in a large space. The buffer fluid chamber 44 may be a single space or may be a plurality of spaces. When configuring the buffer fluid chamber 44 with a single space, it is preferable to form a space having an annular cross section and extending in the axial direction in the interior of the casing 12. When providing the plurality of buffer fluid chambers 44, they may be provided in the casing as, for example, a plurality of the buffer fluid chambers 44 extending in the axial direction, being arranged away from each other in the circumferential direction of the casing 12, and extending axially therefrom toward the guide part 14 as the plurality of branched flow passages 46, 48 positioned at different locations.

The branched flow passages 46, 48 are a plurality of flow passages being branched from the buffer fluid chamber 44, extending toward the inner wall surface 16 of the guide part 14, and opening on the inner wall surface 16. The branched flow passages 46, 48 are branched into a plurality of passages from the buffer fluid chamber 44 with respect to the axial direction as shown in FIG. 1. Accordingly, the fluid may be blown out from the openings provided at a plurality of positions with respect to the axial direction toward the outer peripheral surface of the valve element 20, and the fluid may be supplied uniformly with respect to the axial direction of the outer peripheral surface 26 of the valve element 20. In FIG. 1, the branched flow passages 46 are shown as having openings so as to oppose the outer peripheral surface of a portion of the valve element 20 having the largest outer diameter, and the branched flow passages 48 are shown as having openings so as to oppose the outer peripheral surface of a thin shaft portion of the valve element 20 at the rear end portion. Except for these openings, openings may be formed at appropriate positions with respect to the axial direction. Also, as shown in FIG. 2, the branched flow passages 46 are arranged equidistantly with respect to the circumferential direction of the casing 12. Accordingly, the fluid may be supplied uniformly with respect to the circumferential direction of the outer peripheral surface 26 of the valve element 20. In this manner, by arranging a plurality of the branched flow passages 46, 48 in the axial direction and a plurality of the same also in the circumferential direction, the fluid may be blown out substantially uniformly over the entire outer peripheral surface of the valve element 20.

The guide part 14 is a space in which the valve element 20 is arranged in the interior thereof, and one end thereof is connected to the fluid outlet as described above. Therefore, the fluid is caused to flow as described below. In other words, the fluid flows, in sequence, from the fluid inlet 40—(the flow passage extending in the radial direction)—the buffer fluid chamber 44—the branched flow passages 46, 48—the openings on the inner wall surface 16 of the guide part 12—a clearance 50 between the inner wall surface 16 and the outer peripheral surface 26 of the valve element 20—the fluid outlet 52.

The fluid outlet 52 is provided with a seal portion 18 at a portion corresponding to the tip of the valve element 20. The seal portion 18 is an annular member, and has an inner diameter substantially the same as the inner diameter of the portion of the fluid outlet 52 of the casing 12 other than the seal portion 18. The seal portion 18 is fixedly provided in the casing 12 so as to match the inner diameter thereof with the inner diameter of the portion of the fluid outlet 52 of the casing 12 other than the seal portion 18. The fixing method may be, for example, fusion bonding, adhesion, and so on. The inner peripheral surface of the seal portion 18 is a part of the outlet 52. The seal portion 18 is formed of a different material from the casing 12, and a material having a higher elasticity than metal is preferably used. For example, plastic having high thermal resistance and high abrasion resistance may be used as the material. The plastic material as such includes a wholly aromatic polyimide resin or the like and, for example, when the fluid is high-pressure gas or the like, Vespel (Registered Trademark of Du Pont) may be used.

As a matter of fact, there is a case in which a material other than the wholly aromatic polyimide resin is preferable as the material of the seal portion 18, depending on the application of the fluid control valve 10. For example, when the fluid is liquid and a slight amount of leakage is allowable, a less expensive metal may be used as a material. When the fluid is a low-pressure gas, and attention should be paid also to prevent slight leakage, rubber having higher elasticity is preferably used as the material.

The valve element 20 is a member having a cylindrical center portion having a circular cross-section, a tapered tip 22 having a diameter reducing gradually from the center portion toward the tip side, and a rear end portion 24 assuming the form of a shaft having a thinner diameter than the center portion. The valve element 20 has a function of controlling the flow of the fluid by the tip 22 coming into contact with or separating from the fluid outlet 52 of the casing 12 to thereby block or allow the flow of the fluid while being guided by the guide part 14 of the casing 12 and moved by the actuator 30. The valve element 20 may be one obtained by molding metal material into a predetermined shape. As the metal material, for example, stainless steel or the like may be used.

The tip 22 of the valve element 20 is a portion corresponding to the fluid outlet 52 of the casing 12 as described above, and hence the tip and the contact portion at the fluid outlet 52 are formed to have the similar cross-sectional shape so as to achieve good contact. Specifically, the shape of the contact portion of the seal portion 18 is set to be adapted to the shape of the tip of the casing 12.

The actuator 30 is arranged in the casing 12 corresponding to the rear end portion 24 of the valve element 20. The actuator 30 drives the valve element 20 to move in the axial direction, and has a function of controlling the output pressure of the fluid by changing the clearance between the seal portion 18 which constitutes the outlet 52 of the casing 12 and the tip of the valve element 20. The actuator 30 may be configured with the rear end portion 24 of the valve element 20 as the movable element portion and a drive coil 32 arranged so as to surround the periphery thereof as a stationary element portion. Therefore, the movable element portion at the rear end portion of the valve element 20 is required to be a magnetic substance such as iron. When the entire valve element 20 is not the magnetic substance, at least the movable element portion is required to be formed of the magnetic substance.

In order to determine the initial position of the motive driving and the like, an urging spring 34 is provided between the valve element 20 and the casing 12. In the example shown in FIG. 1, a compression coil spring is preferably employed as the urging spring 34 so as to press the valve element 20 against the seal portion 18 in an initial state in which a motive drive force is not applied.

The drive coil 32 is connected to an unillustrated drive circuit. The drive circuit is connected to a control unit, and supply of or cutting off of a drive current is carried out under the instruction of the control unit. When the drive current is supplied, the movable element portion serving as the rear end portion 24 receives the motive drive force in the axial direction, whereby the tip 22 of the valve element 20 and the seal portion 18 are separated away from each other. When the drive current is cut off, the tip 22 of the valve element 20 comes into contact with the seal portion 18 by a restoring force of the urging spring 34.

The operation of the fluid control valve 10 having the configuration as described above will be described below. In a fuel gas supply system of the fuel cell system, the fluid control valve 10 is connected at the fluid inlet 40 of the casing 12 to a piping on the fuel gas supply side and at the outlet 52 to a piping on the fuel cell stack side. As described above, since the flow passage which allows the fluid to flow communicates from the fluid inlet 40—(the flow passage extending in the radial direction)—the buffer fluid chamber 44—the branched flow passages 46, 48—the openings on the inner wall surface 16 of the guide part 12—the clearance 50 between the inner wall surface 16 and the outer peripheral surface 26 of the valve element 20—the fluid outlet 52, in sequence by the fluid flow passage 42 in the interior of the casing 12, the fuel gas serving as the fluid fills the respective flow passages.

In a state in which no instruction is issued from the control unit, not shown, the drive current is not supplied to the drive coil 32 of the actuator 30, and hence the valve element 20 is pressed in contact against the seal portion 18 by the pressing force of the urging spring 34, so that the flow of the fluid is blocked, and the fuel gas is not supplied from the fluid outlet 52 to the fuel cell stack side.

When supplying the fuel gas to the fuel cell stack, the control unit issues an instruction to supply the drive current to the actuator 30 at a duty cycle corresponding to the required output to the drive circuit. The duty cycle is ON time/(ON time+OFF time), and is here a ratio of the duration to supply the drive current per cycle of the drive circuit. For example, when the duty cycle is 40% assuming that one cycle of the drive control is 10 msec, the drive current flows for 4 msec, is blocked for 6 msec, then flows for 4 msec, is blocked for 6 msec, and so on repeatedly. Accordingly, the valve element 20 is moved rearward so as to move away from the seal portion 18 for 4 msec during which the drive current flows, and the fuel gas is allowed to flow out from the fluid outlet 52. Here, the term "rearward" is a direction to move away from the seal portion 18.

When the fuel gas flows from the fluid outlet 52, the fluid flows into the above-described fluid flow passage 42. For example, the fluid flows from the buffer fluid chamber 44 into the plurality of branched flow passages 46, 48 branched with respect to the axial direction. As described above, the branched flow passages 46 blow out the fluid from the openings opposing the outer peripheral surface of the center portion of the valve element 20, and the branched flow passages 48 blow out the fluid from openings opposing the movable element portion of the thin shaft portion; that is, the rear end portion 24 of the valve element 20. Here, the branched flow passages 48 actually blow out the fluid onto the movable element portion of the valve element 20 through the drive coil 32. Also, since the branched flow passages 46, 48 are arranged uniformly with respect to the circumferential direction of the casing 12, the fluid is blown out uniformly with respect to the circumferential direction of the valve element 20.

The blown out fluid flows into a narrow clearance between the inner wall surface 16 of the guide part 14 of the casing 12 and the outer peripheral surface 26 of the valve element 20. The fluid flowing between the opposing surfaces applies a force to widen the clearance between the opposing surfaces, and hence the clearance between the opposing surfaces is determined by the balance with the pressing force between the opposed surfaces. In other words, the clearance between the opposing surfaces is secured by the fluid, and one surface is lifted relative to the other surface in a non-contact state. This phenomenon is known as a fluid supporting mechanism, a fluid bearing mechanism, a fluid supporting action, or a fluid bearing action.

As described above, the size of the clearance formed by the fluid bearing action is determined by the pressure of the supplied fluid and the pressing force between the opposing surfaces. In the case illustrated in FIG. 1, since the inner wall surface 16 of the guide part 14 of the casing 12 and the outer peripheral surface 26 of the valve element 20 are both axial symmetrical, the pressing force with respect to the clearance on the left side in FIG. 1, for example, is equivalent to the pressing force with respect to the clearance on the right side. Therefore, the clearance between the inner wall surface 16 of the guide part 14 of the casing 12 and the outer peripheral surface 26 of the valve element 20 is uniform at all points. In other words, when being lifted and supported by the fluid and when the flow of the fluid is uniform, the axis of the valve element 20 is automatically centered so as to match the axis of the guide part 14 of the casing 12.

In this manner, while the drive current is supplied to the drive coil 32, the valve element 20 is supported by the fluid so as not to come into contact with the guide part 14. Then, when the supply of the drive current with respect to the drive coil 32 is stopped, the valve element 20 is moved forward into contact with the seal portion 18 and is firmly pressed against the seal portion 18 by the restoration force of the urging spring 34, whereby the fluid is blocked. At this time, since the high-pressure fluid stays between the guide part 14 and the valve element 20, the inner wall surface 16 of the guide part 14 and the outer peripheral surface 26 of the valve member are kept in a non-contact state. Subsequently, when the drive current is supplied to the drive coil 32 again, the valve element 20 moves rearward away from the seal portion 18. Since the valve element 20 is supported by the flowing fluid in a non-contact state from the guide part 14 at this time as described above, the valve element 20 moves from the inner wall surface 16 of the guide part 14 in a non-contact state.

Therefore, in the opening and closing operations of the fluid control valve 10, the outer peripheral surface 26 of the valve element 20 is constantly in non-contact with the inner wall surface 16 of the casing 12. Repetition of contact and non-contact occurs only in the contact portion between the tip 22 of the valve element 20 and the seal portion 18. Therefore, in the operation of the fluid control valve 10, the sliding movement between the valve element 20 and the casing 12 seldom occurs, and hence the abrasion is significantly restrained. Accordingly, contamination, with the abrasion powder, of the fuel gas flow passage on the downstream side from the fluid outlet 52, the fuel cell stack, and the like is prevented.

In this manner, the fluid control valve 10 is able to block and release the fluid repeatedly and intermittently by the duty cycle of the drive current of the drive coil 32 while restraining the abrasion. By repeating the intermittent opening and closing appropriately, a secondary pressure, which is the pressure on the side to be connected to the fluid outlet 52, may be lowered to a desired value with respect to a primary pressure as a pressure of the fluid to be supplied from the fluid inlet 40. For example, by appropriately setting the duty cycle of the intermittent opening and closing of the fluid control valve 10, the secondary pressure may be lowered to level between about one-tenth and one-twice of the primary pressure. Here, by employment of the intermittent opening and closing of the fluid control valve 10 for controlling the pressure, flow rate control is also achieved.

INDUSTRIAL APPLICABILITY

The present invention is used, for example, for a fluid control valve used in pressure control or flow rate control of fuel gas of a fuel cell system.

The invention claimed is:
1. A fluid control valve comprising:
a valve element having a tip for controlling a flow of fluid;
a casing having:
    a fluid inlet,
    a guide part integrally formed in the casing, for guiding the valve element so as to be capable of moving in the axial direction, and
    a fluid outlet arranged so as to oppose the tip of the valve element,
    wherein the guide part is provided at a center portion of the casing along the axial direction and includes an elongated cylindrical space portion having a circular cross section, and
    wherein the guide part is constructed such that an inner wall surface of the guide part guides an outer peripheral surface of the valve element;
a fluid flow passage to supply the flow of fluid from the fluid inlet to the guide part,
    wherein the fluid flow passage is provided in the casing for guiding the fluid from the fluid inlet to the fluid outlet,
    wherein the fluid flow passage has an opening in an inner wall surface of the guide part, for supplying the fluid from the outside of the guide part in the radial direction of the guide part to a clearance between the inner wall surface of the guide part and an outer peripheral surface of the valve element, and for causing the valve element to lift relative to the inner wall surface of the guide part; and
    wherein the fluid flow passage passes from the fluid inlet through an interior of the casing and causes the fluid to blown out toward the outer peripheral surface of the valve element from exhaust openings arranged, in the inner wall surface of the guide part, equidistantly with respect to the circumferential direction of the casing, the fluid flow passage further comprising:
        at least one buffer fluid chamber provided outside the guide part with respect to the radial direction of the guide part in the interior of the casing; and
        a plurality of branched flow passages connecting the buffer fluid chamber to the plurality of exhaust openings;

a guide part-to-valve element fluid flow passage, wherein the flow passage is connected between the fluid flow passage and the outlet of the fluid, and is provided between the inner wall surface of the guide part and the outer peripheral surface of the valve element; and an actuator for driving the valve element to move in the axial direction with respect to the casing and varying the clearance between the outlet of the casing and the tip of the valve element to thereby control the output flow rate or the output pressure of the fluid, the actuator comprising:

a drive coil provided inside the guide part with respect to the radial direction of the guide part in the interior of the casing; and a movable element portion that is connected to the valve element or included in the valve element, wherein the buffer chamber is provided outside the drive coil with respect to the radial direction of the casing in the interior of the casing.

2. The fluid control valve according to claim 1, wherein:
the fluid flow passage to supply the flow of fluid from the fluid inlet to the guide part further includes an actuator portion fluid flow passage for supplying the fluid to a clearance between an outer periphery of the movable element portion and an inner peripheral surface of the drive coil to thereby cause the movable element portion to lift relative to the inner peripheral surface of the drive coil.

3. The fluid control valve according to claim 1, further comprising a seal portion provided at the outlet of the casing, having an opening of a shape corresponding to the shape of the tip of the valve element, and being formed of a different material from the casing.

4. The fluid control valve according to claim 3, wherein the seal portion is formed of a material having higher elasticity than metal.

5. The fluid control valve according to claim 1, wherein:
the actuator has two drive coils provided apart from each other in the axial direction in the interior of the casing; and the fluid control valve further comprises a movable element exhaust flow passage which is provided between the two drive coils so as to be connected to the buffer fluid chamber, and which causes the fluid to pass between the two drive coils and to be blown out to the movable element.

* * * * *